(12) United States Patent
Shkurko et al.

(10) Patent No.: US 12,536,731 B2
(45) Date of Patent: Jan. 27, 2026

(54) ACCELERATION STRUCTURES WITH DELTA INSTANCES

(71) Applicant: Advanced Micro Devices, Inc., Santa Clara, CA (US)

(72) Inventors: Konstantin I. Shkurko, Orlando, FL (US); Matthäus G. Chajdas, Munich (DE); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/488,167

(22) Filed: Sep. 28, 2021

(65) Prior Publication Data

US 2023/0097562 A1 Mar. 30, 2023

(51) Int. Cl.
*G06T 15/06* (2011.01)
*G06T 3/4007* (2024.01)
*G06T 9/00* (2006.01)
*G06T 15/08* (2011.01)
*G06T 17/10* (2006.01)

(52) U.S. Cl.
CPC ............ *G06T 15/06* (2013.01); *G06T 3/4007* (2013.01); *G06T 9/001* (2013.01); *G06T 15/08* (2013.01); *G06T 17/10* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 2009/0167763 A1* | 7/2009 | Waechter | G06T 15/40 345/426 |
| 2011/0080403 A1* | 4/2011 | Ernst | G06T 15/06 345/420 |
| 2016/0071312 A1* | 3/2016 | Laine | G06T 17/10 345/419 |
| 2017/0287203 A1* | 10/2017 | Vaidyanathan | G06T 15/06 |
| 2018/0190013 A1* | 7/2018 | Wald | G06T 17/005 |
| 2023/0215091 A1* | 7/2023 | Drabinski | G06T 15/06 345/426 |

FOREIGN PATENT DOCUMENTS

GB 2593946 A * 10/2021 ............ G06T 15/06
JP 2009193095 A * 8/2009

OTHER PUBLICATIONS

Lefrancois, M.-K. & Gautron, P., "DX12 Raytracing tutorial—Part 1", NVIDIA Corporation, retrieved from: https://developer.nvidia.com/rtx/raytracing/dxr/dx12-raytracing-tutorial-part-1 on Sep. 28, 2021, 4 pages.

* cited by examiner

*Primary Examiner* — Aaron M Richer
(74) *Attorney, Agent, or Firm* — Volpe Koenig

(57) ABSTRACT

Described herein is a technique for performing ray tracing operations. The technique includes encountering, at a non-leaf node, a pointer to a bottom-level acceleration structure having one or more delta instances; identifying an index associated with the pointer, wherein the index identifies an instance within the bottom-level acceleration structure; and obtaining data for the instance based on the pointer and the index.

20 Claims, 7 Drawing Sheets

ACCELERATION STRUCTURES WITH DELTA INSTANCES

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein is a technique for performing ray tracing operations. The technique includes encountering, at a non-leaf node, a pointer to a bottom-level acceleration structure having one or more delta instances; identifying an index associated with the pointer, wherein the index identifies an instance within the bottom-level acceleration structure; and obtaining data for the instance based on the pointer and the index.

Figure 1:
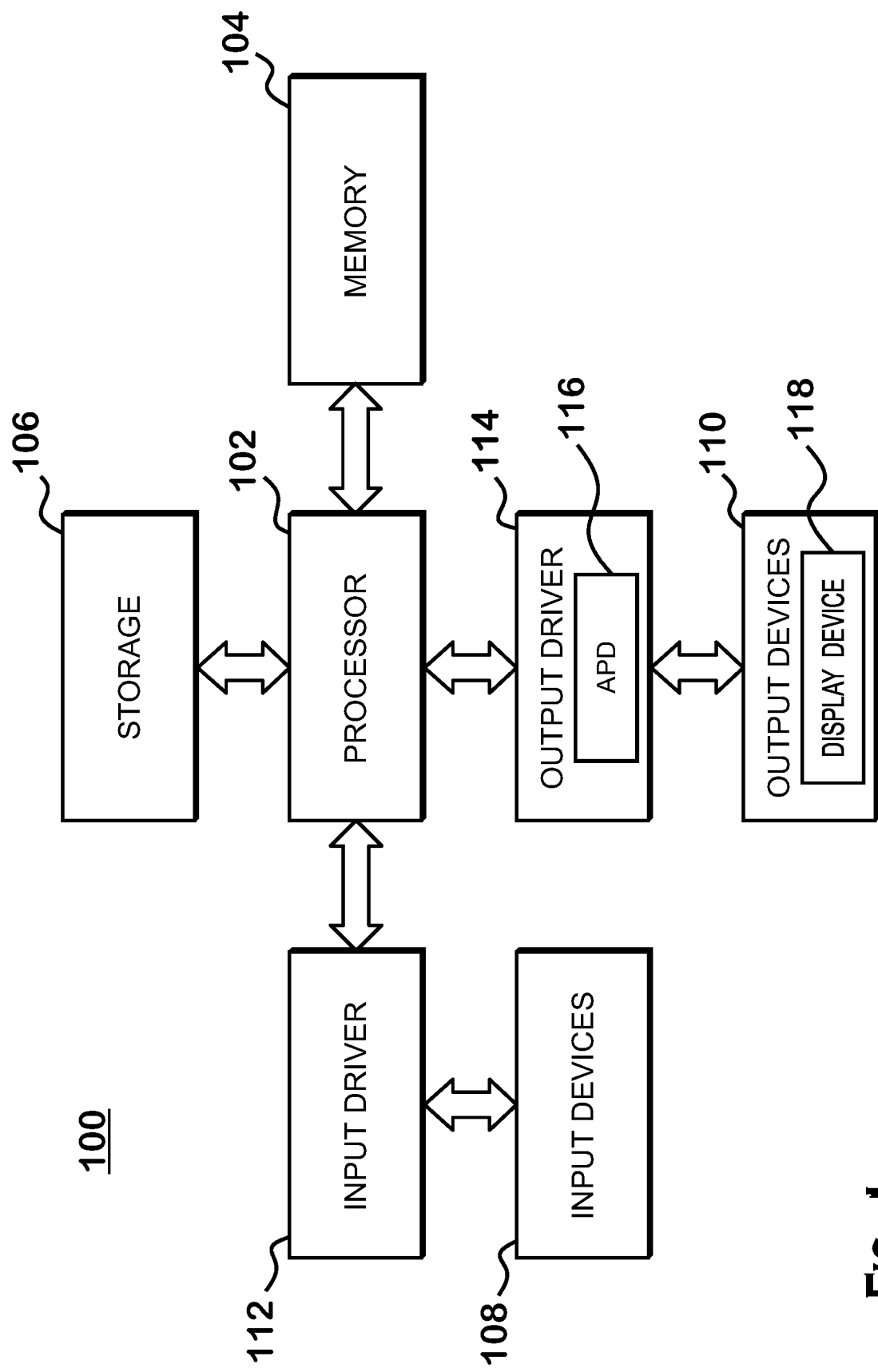
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm perform the functionality described herein.

Figure 2:
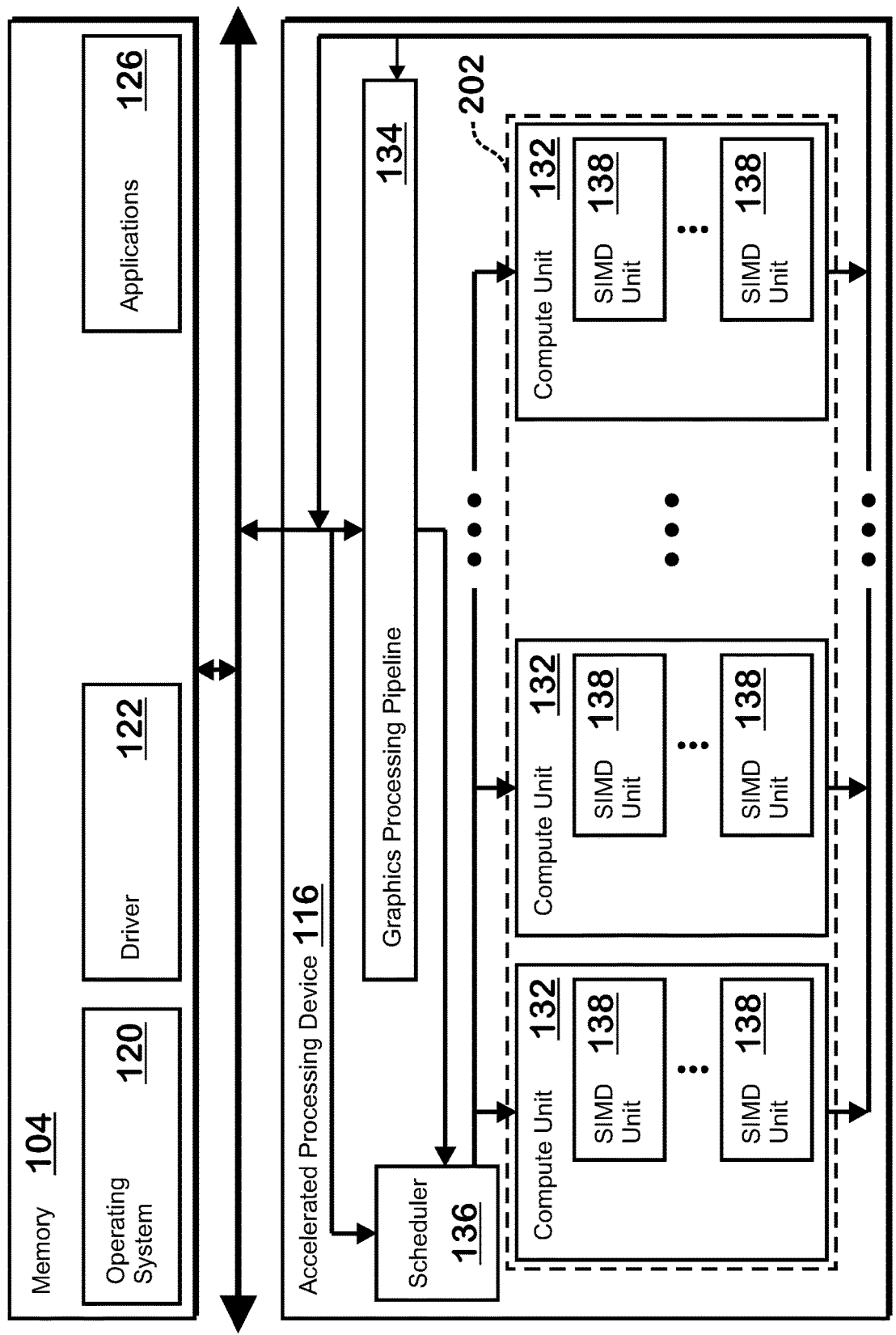
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
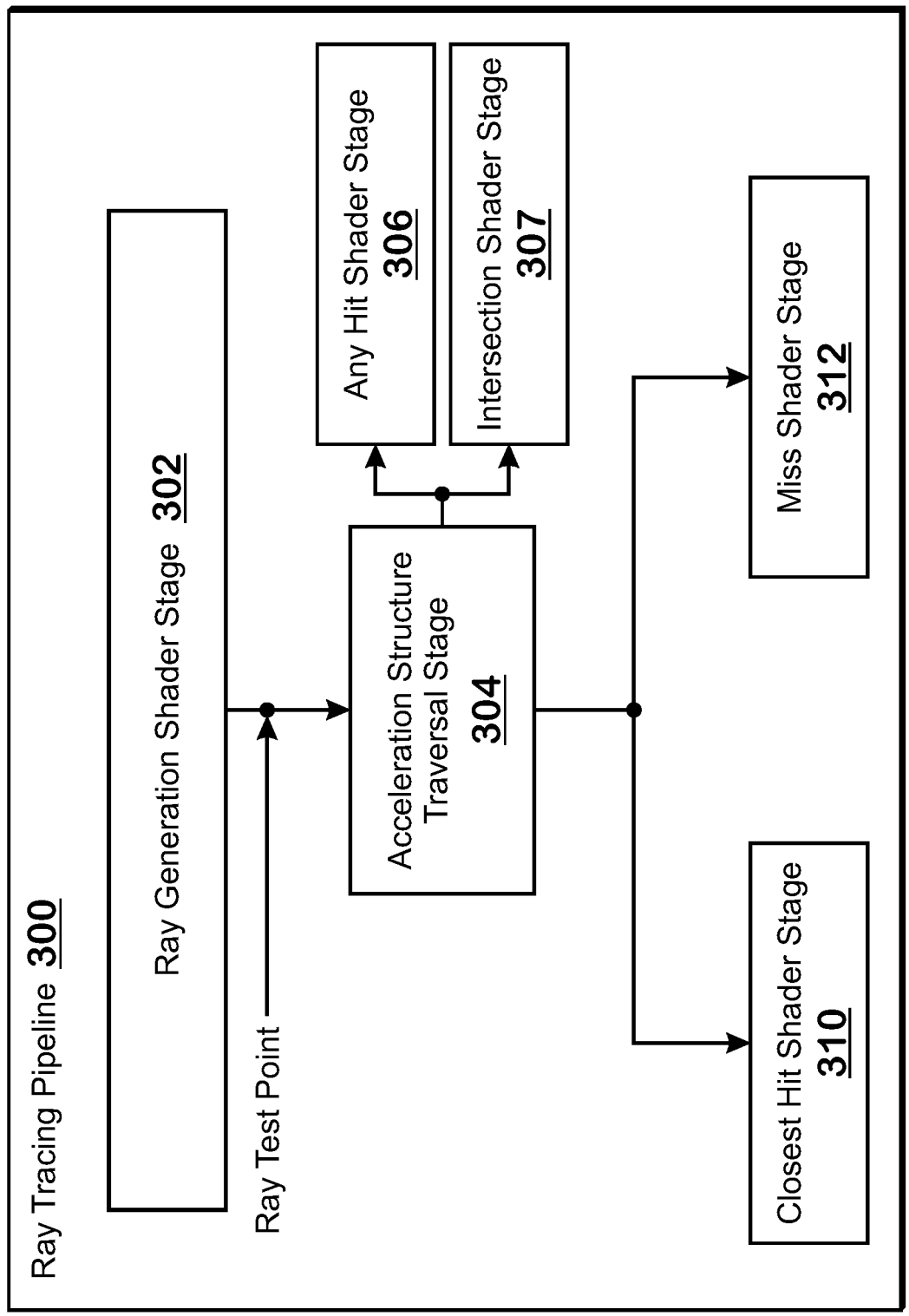
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against box nodes and triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle or other geometry against which a ray intersection test can be performed. Note, it is possible for the subdivisions to overlap, since the bounding boxes enclose the geometry within the given subdivided region. In other words, the subdivision above describes the manner in which a space is partitioned for multiple box nodes. Each such box node is sized to bound the triangles within a respective partition, and those triangles may overlap the bounding plane between regions.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles within that box can be eliminated from the test. Thus, a ray intersection test is performed as a sequence of tests of the ray against axis-aligned bouncing boxes, followed by tests against triangles. Traversal of the bounding volume hierarchy can proceed in any technically feasible order, such as width first (testing all nodes in a level before proceeding to another level), depth first (testing down to a leaf node before proceeding to a different branch), or any other order.

Figure 4:
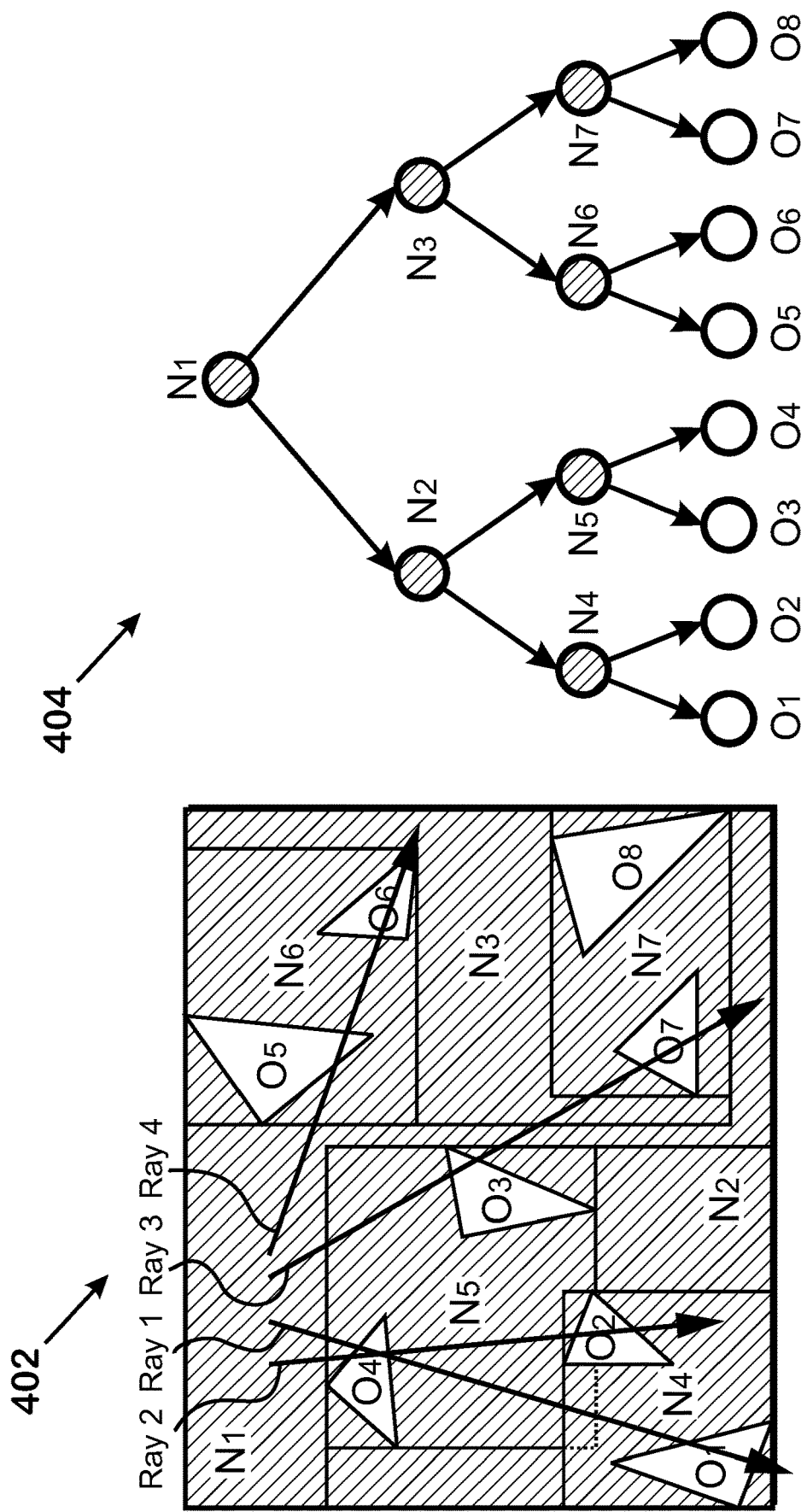
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangles, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

Figure 5:
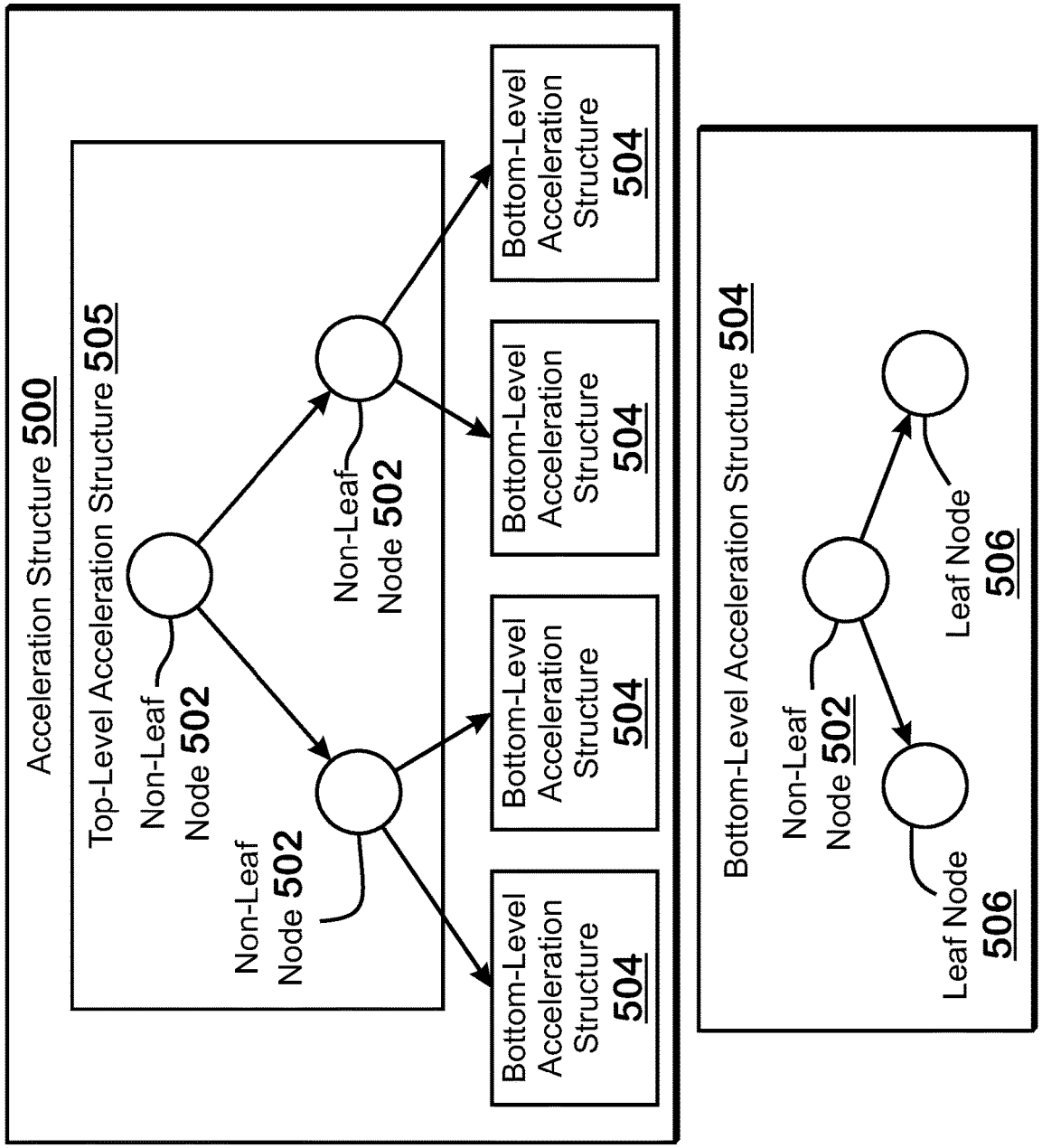
FIG. 5 is an illustration of an acceleration structure.

FIG. 5 illustrates an example acceleration structure 500. The example acceleration structure 500 serves the same purpose as the bounding volume hierarchy 404 of FIG. 4. More specifically, the acceleration structure 500 includes non-leaf nodes 502 and leaf nodes (within the bottom-level acceleration structures 504, as shown at least in FIG. 6A). The ray tracing pipeline 300 performs a ray intersection test by traversing the acceleration structure 500. Specifically, the ray tracing pipeline 300 tests the ray against the bounding boxes associated with the non-leaf nodes, eliminating descendants of such nodes if the intersection test fails. For leaf nodes, the ray tracing pipeline 300 uses the results of the intersection to determine whether the ray hits or misses associated geometry. In an example, if the ray intersects with the geometry associated with a leaf node, then the ray is deemed to hit that leaf node and if the ray does not intersect with the geometry associated with a leaf node, then the ray is deemed to miss that leaf node.

The acceleration structure 500 is a two-level acceleration structure that includes a top-level acceleration structure 505 and one or more bottom-level acceleration structure 504. The top-level acceleration structure 505 includes non-leaf nodes 502, some of which include pointers to bottom-level acceleration structures 504. In some implementations, the top-level acceleration structure 505 also includes leaf nodes (similar to the leaf nodes 506 of the bottom-level acceleration structures 504). The bottom-level acceleration structures 504 include leaf nodes 506. Some bottom-level acceleration structures 504 include non-leaf nodes 502 that include pointers to non-leaf nodes 502 or leaf nodes 506.

As stated above, the acceleration structure 500 is a two-level acceleration structure. Thus the acceleration structure 500 includes a top-level acceleration structure 505 and one or more bottom-level acceleration structures 504. One benefit of a two-level acceleration structure is that portions of the acceleration structure can be instanced. Specifically, it is possible for the bottom-level acceleration structures 504 to include multiple copies or "instances" of the single bottom-level acceleration structure 504. Non-leaf nodes of the top-level acceleration structure 505 include pointers to instances, thereby allowing a single copy of the data to be used at multiple places in the acceleration structure 500, by simply including a pointer to the same bottom-level acceleration structure 504 at different non-leaf nodes 502 (or even at the same non-leaf node 502). The instancing provides the benefit that a smaller amount of data is required as compared with an acceleration structure in which instancing does not occur. Note that instances can have positional offsets and/or orientation differences as compared with each other, to allow for placement and rotation of instances through a scene.

One issue with instancing is that in the event that the acceleration structure 500 is to include multiple "near copies" (that is, copies of a bottom-level acceleration structure with small modifications), if only exact copies are used for instances, then a large amount of data would need to be stored for only such small changes. Put differently, if an acceleration structure 500 includes many instances and the geometry of those instances is changed in relatively minor ways, then, in some implementations, new instances would have to be created for each such different instance of geometry.

Figure 6A:
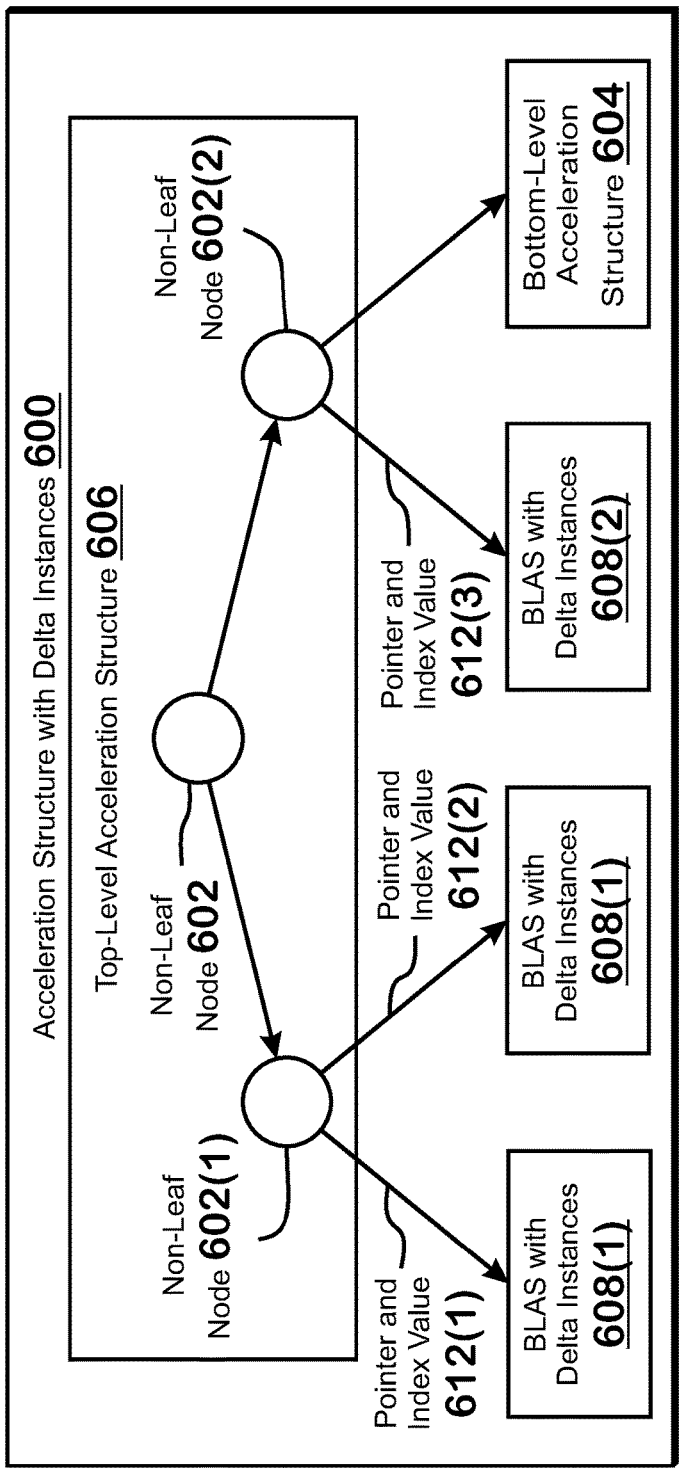
FIG. 6A illustrates an acceleration structure with delta instances, according to an example.

For the above reasons, the present disclosure provides techniques for including bottom-level acceleration structures with delta instances in an acceleration structure. FIG. 6A illustrates an acceleration structure with delta instances 600, according to an example. The acceleration structure with delta instances 600 includes a top-level acceleration structure 606 and one or more bottom-level acceleration structures ("BLAS's"). The top-level acceleration structure 606 is similar to the top-level acceleration structure 505 of FIG. 5. For example, the top-level acceleration structure 606 includes one or more non-leaf nodes 602. These non-leaf nodes include pointers to child nodes, which are one of non-leaf nodes 602, leaf nodes (not shown in FIG. 6A), or bottom-level acceleration structures (either BLASs with delta instances 608 or bottom-level acceleration structures 604 which do not include delta instances). In addition to these pointers, the non-leaf nodes 602 that point to BLASs with delta instances 608 include an index value that points to a specific instance within the BLAS with delta instances. The BLAS with delta instances 608 stores a representation of multiple instances that have relatively small differences from each other.

The fact that the instances within a BLAS with delta instances 608 has relatively small differences means that it is possible to represent these instances with a smaller amount of information than if all data for each instance were stored. In other words, the BLAS with delta instances 608 is a compressed structure that represents several similar instances with less data than if those instances were stored in a raw, uncompressed format. In some examples, within a BLAS with delta instances 608, the full raw data for a base instance is stored and compressed data for delta instances are stored.

During traversal of the acceleration structure with delta instances 600, when the ray tracing pipeline 300 arrives at a non-leaf node 602 that points to a BLAS with delta instances 608, the ray tracing pipeline 300 traverses to a particular instance based on the index value, which, again, identifies one of the instances within the BLAS with delta instances 608. The ray tracing pipeline 300 obtains the data for the appropriate instance based on the pointer and index. If the index identifies the base instance, which is stored in a raw format, the ray tracing pipeline 300 obtains the data for that instance. If the index identifies a delta instance, then the ray tracing pipeline 300 obtains the data for the delta instance and applies the data for the delta instance to the data for the base instance to obtain values for the delta instance.

In various examples, one or more of the following compression techniques are used to compress the delta instances: an identity compression technique in which attributes (e.g., vertex positions or other vertex attributes) that are the same between a delta instance and the base instance are represented in a highly compressed format that is much less data than the raw value (such as with a single value such as a bit that indicates the same value); a delta compression technique in which attributes that are different between a delta instance and the base instance are represented with a reduced range that requires a smaller amount of bits than the raw data (for example, if the raw data for a vertex position includes three 64-bit values, but the differences in vertex positions between the delta instance and the base instance are small enough to be represented by 8-bit numbers, then the amount of required storage is reduced—a similar technique is also possible for box node positions); a shared box node technique in which box nodes within a BLAS with delta instances 608 are shared between the base instance and the delta instances; and a shared pointer technique in which the pointers from the box nodes to child nodes are included within the base instance but omitted from the delta instances, since it is possible to infer the values of those pointers based on the index value 612.

In the identity compression technique, data elements in a delta instance that are identical to the corresponding element of the base instance are represented with a much smaller amount of data than the raw data. In an example, if a position value in a delta instance (such as the x value for one vertex of a triangle) is identical to the corresponding position value in the base instance, then the data for the delta instance includes a value indicating this identity, for the position value. In an example, a bitmask for the BLAS with delta instances 608 includes a bit for each data element of the delta instances, and each bit indicates whether the value is identical to the corresponding value of the base instance. In some implementations, in the case where the delta instance has a value that is identical to the corresponding value of the base instance, the data for the delta instance value (other than the indication that the values are identical) is omitted.

In the delta compression technique, the differences between a set of values of a BLAS with delta instances 608 and the corresponding values of a base instance is evaluated to determine the range of such differences. If this range is lower than a threshold, then these differences are represented with delta values. Because the range of a numerical format determines the number of bits required for that format, each such value is representable with a smaller amount of data than the raw data. In some examples, the set of values includes all values that fall within the threshold range. In such examples, values having a difference to the corresponding value of the base instance does not fall within the range is represented with raw data or using some other compressed format. In other examples, the set of values includes values of a certain type (e.g., all position values, all position values of a triangles, all values of certain attribute types), and sets whose values all fit within the range are represented using the delta compression technique. In some examples, it is possible to represent portions of such sets with the delta compression techniques, with the other values that do not fit within the range represented as raw data or using another compression technique.

In the shared box node technique, data for box nodes is included only within the base instance. Such box nodes are sized large enough to bound the corresponding triangles for all instances of the BLAS with delta instances 608 that includes the box node (non-leaf node). More specifically, the topology of each instance within a BLAS with delta instances 608 is the same. The topology refers to the number of non-leaf nodes and leaf nodes and the pointers from the non-leaf nodes to other nodes. In the shared box node technique, data for non-leaf nodes, including both geometry and pointers, is included within the base instance but not within the delta instances. Each such box node is sized and positioned to bound all of the child geometry of that box node in all instances. In an example, a box node points to a first and a second leaf node in all instances of a BLAS with delta instances 608. In a base instance, the first and second leaf nodes have first and second sets of vertex data, respectively. In a first delta instance, the first and second leaf nodes have first and second sets of vertex data that differ somewhat from the first and second sets of the base instance. In a second delta instance, the first and second leaf nodes also have first and second sets of vertex data that differ from the first and second sets of the base instance. The bounding box of the base instance is sized and positioned to bound the first and second leaf nodes of the base instance, the first delta instance, and the second delta instance. Configuring the bounding box in this manner allows for the omission of bounding box information for each delta instance, reducing the total amount of data needed for the BLAS with delta instances 608.

In the shared pointer technique, in the base instance of a BLAS with delta instances 608, the non-leaf nodes include pointers to the leaf nodes of that base instance. For delta instances, the ray tracing pipeline 300 uses these pointers to obtain data by reading the data at a location that is at an offset from the pointer address, where the offset is based on the index value provided. In an example, the base instance includes a non-leaf node that includes a first pointer to a first leaf node of the base instance and a second pointer to a second leaf node of the base instance. The delta instances do not include any such pointers. The ray tracing pipeline 300 accesses data for a first leaf node of a first delta instance. The first leaf node of the base instance is similar to the first leaf node of the first delta instance, and thus the first leaf node of the first delta instance is stored as information indicating the differences between the first leaf node of the first delta instance and the first leaf node of the base instance. The ray tracing pipeline 300 accesses the data for the first leaf node of the first delta instance by referring to the address specified by the pointer to the first leaf node of the base instance and accessing the data that is at an offset from that pointer, where the offset is associated with the first delta instance. In an example, data for leaf nodes are stored in each instance in an ordered manner and each instance is stored as a contiguous portion of data. Thus the data for a first delta instance is stored directly after the data for a base instance, the data for a second delta instance is stored directly after the data for the first delta instance, and so on. To access the data for the first delta instance using the index provided above pointer described above, the ray tracing pipeline 300 accesses the node identified by the index provided and uses the pointer from the base instance to identify the specific node within that instance. This pointer can be the same value for all instances if all nodes within each instance is found in the same position in each instance. For example, if the pointer points to a second node in the instance, then the pointer refers to each second node in all instances, and the index specifies the specific node requested.

In FIG. 6A, the BLAS with delta instances 608 that have exactly the same reference number are identical. Thus, for non-leaf node 602(1), which includes pointer and index value 612(1) and pointer and index value 612(2), both of such pointers point to the same BLAS with delta instances 608. However, the pointer and index value 612(1) indicates a different instance than the pointer and index value 612(2). Thus these pointers and index values 612 refer to different instances within the same BLAS with delta instances 608.

Above, the term "attributes" is used. Other than position, this term refers to any data about geometry such as triangle, including color, texture coordinates, or other data such as per-vertex data which is used to describe vertices of geometry.

Figure 6B:
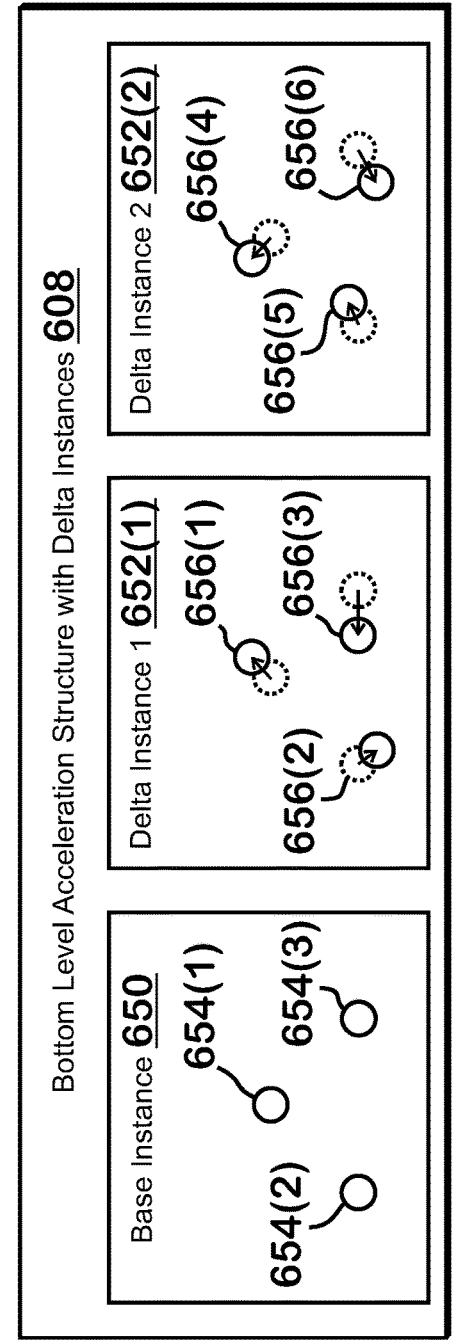
FIG. 6B illustrates a bottom level acceleration structure with delta instances, illustrating position deltas between a base instance and delta instances, according to an example.

FIG. 6B illustrates a bottom level acceleration structure with delta instances 608, illustrating position deltas 656 between a base instance 650 and delta instances 652. Positions, and deltas, for three vertices are illustrated, but it should be understood that it is possible for the instances to include many more positions, for multiple nodes, and to include attributes other than positions.

The illustrated base instance 650 includes three positions 654. Delta instance 1 652(1) includes position deltas 656, and delta instance 2 652(2) includes position deltas 656. Position delta 656(1) is stored as the difference between the position of a vertex for delta instance 1 652(1) and the position for the vertex 654(1) of the base instance 650. Position delta 656(2) is stored as the difference between the position of a vertex for delta instance 1 652(1) and the position for the vertex 654(2) of the base instance 650. Position delta 656(3) is stored as the difference between the position of a vertex for delta instance 1 652(1) and the position for the vertex 654(3) of the base instance 650. For delta instance 2 652(2), position delta 656(4) is stored as the difference between the position of a vertex for delta instance 2 652(2) and the position for the vertex 654(1) of the base instance 650. Position delta 656(5) is stored as the difference between the position of a vertex for delta instance 2 652(2) and the position for the vertex 654(2) of the base instance 650. Position delta 656(6) is stored as the difference between the position of a vertex for delta instance 2 652(2) and the position for the vertex 654(3) of the base instance 650.

Figure 7A:
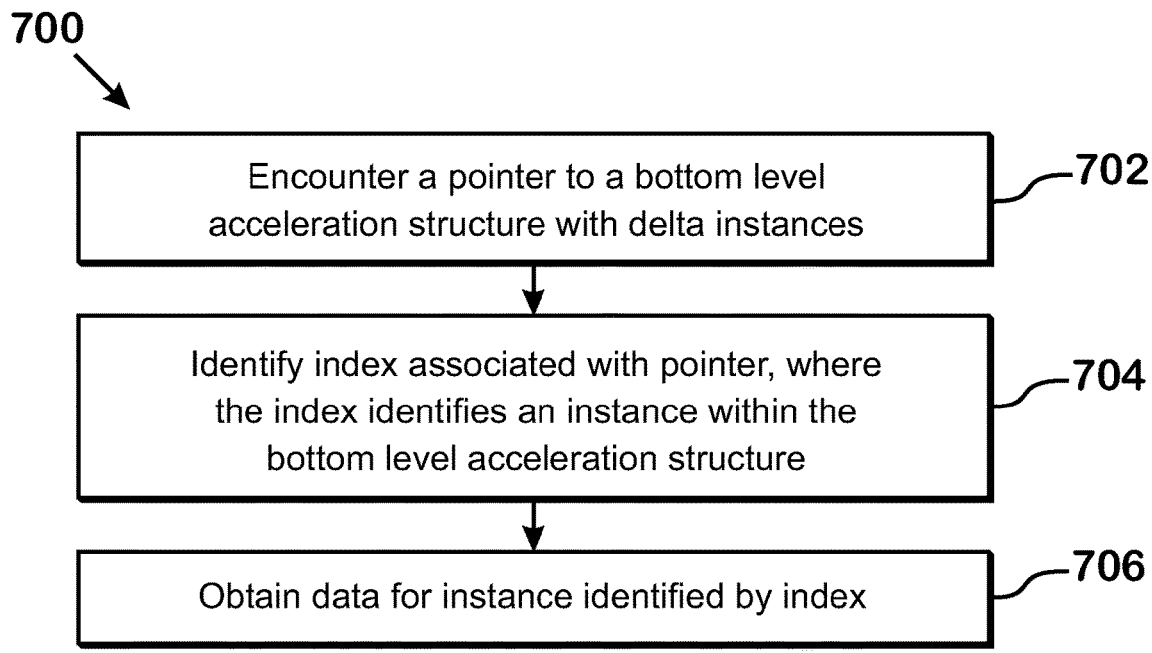
FIG. 7A is a flow diagram of a method for performing ray tracing using an acceleration structure with delta instances, according to an example.

FIG. 7A is a flow diagram of a method 700 for performing ray tracing using an acceleration structure with delta instances 600, according to an example. Although described with respect to the system of FIGS. 1-6B, those of skill in the art will recognize that any system that performs the steps of the method 700 in any technically feasible order falls within the scope of the present disclosure.

At step 702, a ray tracing pipeline 300 encounters a pointer to a bottom level acceleration structure with delta instances 600. The pointer originates at a non-leaf node of a top-level acceleration structure 505. In some examples, step 702 is performed after the ray tracing pipeline 300 has evaluated a ray for intersection against the non-leaf node and determined that the ray intersects the non-leaf node and thus has determined that the ray should be tested for intersection with children of that non-leaf node. At least one such child is a bottom-level acceleration structure with delta instances 600, which is pointed to by the non-leaf node using a pointer of that non-leaf node. This is the pointer to the bottom-level acceleration structure with delta instances 600 that is encountered at step 702.

At step 704, the ray tracing pipeline 300 identifies an index associated with a pointer, where the index identifies an instance within the bottom-level acceleration structure. It should be understood that each child of the non-leaf node has geometry that fits within the bounding box associated with the non-leaf node. Thus the index and pointer points to one item (specifically, one instance of a bottom level acceleration structure with delta instances 600) that is within this bounding box. It is possible for the non-leaf node to have multiple pointers, some or all of which point to one or more bottom-level acceleration structure with delta instances 600 or a bottom-level acceleration structure without delta instances. The pointers that point to a bottom-level acceleration structure with delta instances 600 include associated indices, each of which points to a particular instance of the bottom-level acceleration structure with delta instances 600.

At step 706, the ray tracing pipeline 300 obtains data for the instance identified by the index. If the index refers to the base instance, then the ray tracing pipeline 300 simply obtains that data. If the index refers to a delta instance, then the ray tracing pipeline 300 obtains the data associated with that delta instance and the data for the base instance and obtains data for the delta instance based on the data for the delta instance and the data for the base instance. More specifically, because the data for the delta instance describes differences between the delta instance and the base instance, the ray tracing pipeline 300 applies the delta information to the information from the base instance to obtain the data for the delta instance. The manner in which this application is made depends on how the delta instance is represented. A variety of compression techniques are described elsewhere herein (the identity compression technique, the delta compression technique, the shared box node technique, and the shared pointer technique). For the identity compression technique, for any data indicated as being identical to the base instance, the ray tracing pipeline 300 uses the data from the base instance as the data for the delta instance. For the delta compression technique, the ray tracing pipeline 300 recovers the data for the delta instance by applying the differences for the delta instance to the values of the base instance. For the shared pointer technique, the ray tracing pipeline 300 determines locations of data within the delta instance based on the pointers within the base instance. For the shared box node technique, the ray tracing pipeline 300 uses, as geometric information for non-leaf nodes of the delta instance, the geometric information of the base instance.

Note that, during traversal of the acceleration structure 600 for a particular ray, it is of course possible to obtain data for bottom-level acceleration structures that do not have delta instances.

In some implementations, the steps of the method 700 are performed by the acceleration structure traversal stage 304. In some examples, dedicated hardware circuitry exists to perform the decompression for delta instances (e.g., step 706).

Figure 7B:
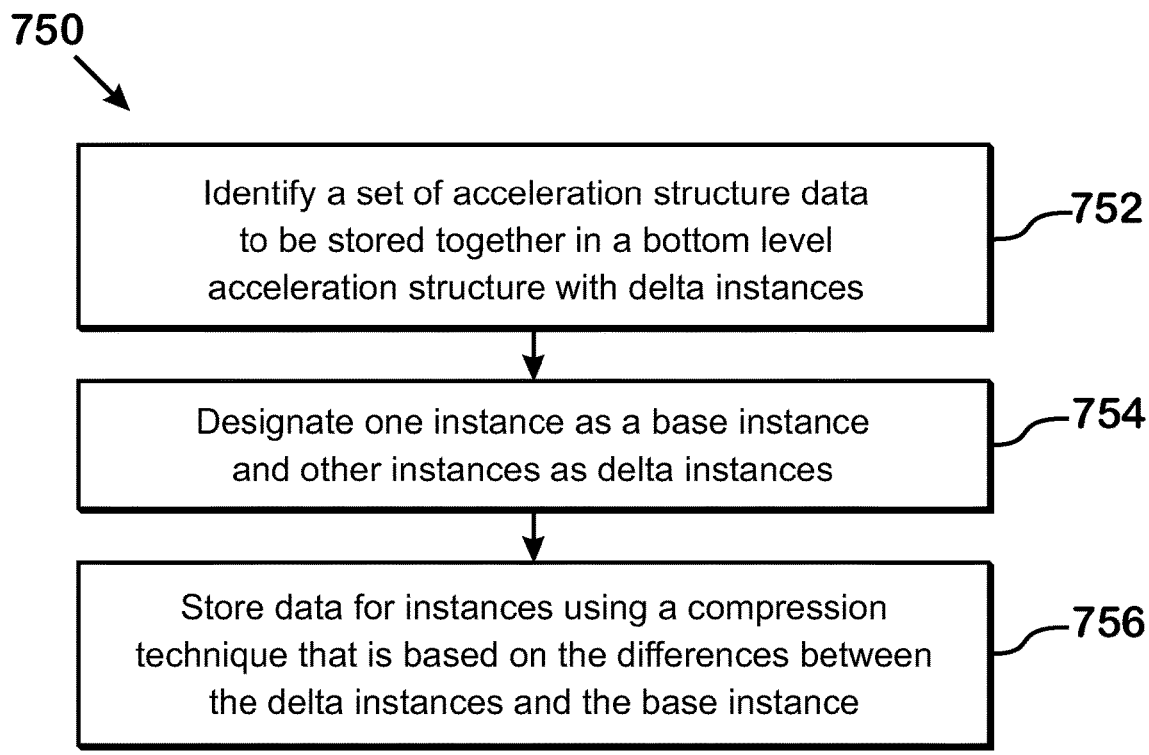
FIG. 7B is a flow diagram of a method for generating bottom-level acceleration structures with delta instances, according to an example.

FIG. 7B is a flow diagram of a method 750 for generating bottom-level acceleration structures with delta instances, according to an example. Although described with respect to the system of FIGS. 1-6B, those of skill in the art will recognize that any system that performs the steps of the method 750 in any technically feasible order falls within the scope of the present disclosure.

In some examples, the steps of the method 750 are performed by an acceleration structure generator. In various examples, the acceleration structure generator includes software for execution on a processor, a hardware processor or circuit configured to perform the operations described, or a combination of hardware and software. In some examples, the acceleration structure generator operates within the system that operates the ray tracing pipeline 300 (such as within the APD 116 or within the operating system 120) or external to that system, such as within software development tools for an application developer.

At step 752, the acceleration structure generator identifies a set of acceleration structure data to be stored together in a bottom level acceleration structure with delta instances. In some examples, the acceleration structure generator is provided with a list of such data by, for example, a human game designer who creates multiple copies of a single set of geometry (for example, a model of a car) and makes changes to those copies. The acceleration structure generator identifies each such modified copy and the original copy as the set of acceleration structure data. In some examples, the acceleration structure generator analyzes a scene or other set of geometry and identifies portions of that scene or set of geometry to obtain a set of data that is sufficiently similar, as the set of acceleration structure data to be stored together.

At step 754, the acceleration structure generator designates one instance as a base instance and other instances as delta instance. In some examples, the acceleration structure randomly selects one of the instances as the base instance and designates the other instances as the delta instances. In other examples, such as where the set includes copies generated by a human designer, the acceleration structure selects the first copy created as the base instance. In other examples, the human designer specifically designates a particular copy as the base instance. Any technically feasible technique for selecting the base instance is possible.

At step 756, the acceleration structure generator stores data for the instances using a compression technique that is based on the differences between the delta instances and the base instance. More specifically, the acceleration structure stores the data for the base instance and stores data for the delta instances in a manner that is compressed according to one or more compression techniques such as those described herein (the identity compression technique, the delta compression technique, the shared box node technique, and the shared pointer technique).

One alternative usage for the bottom level acceleration structure with delta instances 608 is to store multiple "keyframes" for an animation for a model or set of models. In such situations, it is possible for the index that is used to access the bottom-level acceleration structure 504 to have a fractional component that acts as an interpolation coefficient between two instances of the bottom level acceleration structure. The whole number component indicates the two instances whose values are interpolated. The interpolation used is any technically feasible interpolation function such as linear interpolation. Accessing the data using a particular instance involves accessing both such instances and interpolating the values using the interpolation coefficient. In some examples, the ray tracing pipeline 300 accesses an acceleration structure with delta instances 600 at different times (such as in different frames) and provides a different index value with fractional component based on the time of access. The intersection tests thus occur against different geometry based on the time for which the intersection test is performed. This technique allows for geometry of an acceleration structure with delta instances 600 to represent animation or movement. Specifically, the time for which the acceleration structure with delta instances 600 is traversed for a ray determines the geometry that the ray is tested against. Thus, the acceleration structure with delta instances 600 represents an "animated" set of geometry, rather than a static set of geometry.

It should be understood that many variations are possible based on the disclosure herein. In some implementations, where a root node of a bounding volume hierarchy has a preferred orientation (for example, after analyzing the other nodes of the bounding volume hierarchy), the bounding volume hierarchy modifier 600 modifies that root node to be an oriented bounding box having the preferred orientation. In some examples, this conversion occurs where the root node has one or more of a cost above a threshold, a preferred orientation that differs from an unrotated orientation by more than a threshold amount, or a combination of cost and orientation difference (as defined elsewhere herein) that is greater than a threshold amount. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
    encountering a delta instance of a bottom-level acceleration structure of a bounding volume hierarchy that stores data of positional differences between vertices of geometry of a leaf node of a base instance of a bottom-level acceleration structure and vertices of geometry of a leaf node of the delta instance, wherein the geometry of the base instance and geometry of the delta instance are renderable geometry, wherein the base instance and the delta instance have a shared box node sized to bound children of the shared box in the delta instance and children of the shared box node in the base instance;
    obtaining data for the delta instance based on the positional differences; and
    rendering the geometry of the leaf nodes of the base instance and the leaf nodes of the delta instance using the data, wherein the rendering includes traversing the delta instance by traversing to a child of the shared box node in the delta instance based on results of an intersection test between a ray and the shared box node.

2. The method of claim 1, wherein obtaining the data comprises decompressing the delta instance based on the base instance.

3. The method of claim 1, wherein the delta instance includes compressed data that is compressed using an identity compression technique.

4. The method of claim 1, wherein the delta instance includes compressed data that is compressed using a delta compression technique.

5. The method of claim 1, wherein the delta instance includes compressed data that is compressed using a shared pointer technique.

6. The method of claim 1, wherein the delta instance includes compressed data that is compressed using a shared box node technique.

7. The method of claim 1, wherein obtaining the data includes interpolating between two instances of a bottom-level acceleration structure based on an interpolation coefficient.

8. The method of claim 1, wherein the encountering occurs as part of a ray intersection test.

9. A system for performing ray tracing operations, the system comprising:
    a memory; and
    a plurality of compute units that are communicatively coupled to the memory, wherein the plurality of compute units are configured to form
        a bounding volume hierarchy including a bottom-level acceleration structure having one or more delta instances, and
        a ray tracing pipeline,
    wherein the ray tracing pipeline is configured to:
        encounter a delta instance of a bottom-level acceleration structure of a bounding volume hierarchy that stores data of positional differences between vertices of geometry of a leaf node of a base instance of a bottom-level acceleration structure and vertices of geometry of a leaf node of the delta instance, wherein the geometry of the base instance and geometry of the delta instance are renderable geometry, wherein the base instance and the delta instance have a shared box node sized to bound children of the shared box in the delta instance and children of the shared box node in the base instance;
        obtain data for the delta instance based on the positional differences; and
        render the geometry of the leaf nodes of the base instance and the leaf nodes of the delta instance using the data, wherein the rendering includes traversing the delta instance by traversing to a child of the shared box node in the delta instance based on results of an intersection test between a ray and the shared box node.

10. The system of claim 9, wherein obtaining the data comprises decompressing the delta instance based on the base instance.

11. The system of claim 9, wherein the delta instance includes compressed data that is compressed using an identity compression technique.

12. The system of claim 9, wherein the delta instance includes compressed data that is compressed using a delta compression technique.

13. The system of claim 9, wherein the delta instance includes compressed data that is compressed using a shared pointer technique.

14. The system of claim 9, wherein the delta instance includes compressed data that is compressed using a shared box node technique.

15. The system of claim 9, wherein obtaining the data includes interpolating between two instances of the bottom-level acceleration structure based on an interpolation coefficient.

16. The system of claim 9, wherein the encountering occurs as part of a ray intersection test.

17. A non-transitory computer-readable medium storing instructions that, when executed by a processor, causes the processor to perform ray tracing operations, the ray tracing operations including:
    encountering a delta instance of a bottom-level acceleration structure of a bounding volume hierarchy that stores data of positional differences between vertices of geometry of a leaf node of a base instance of a bottom-level acceleration structure and vertices of geometry of a leaf node of the delta instance, wherein the geometry of the base instance and geometry of the delta instance are renderable geometry, wherein the base instance and the delta instance have a shared box node sized to bound children of the shared box in the delta instance and children of the shared box node in the base instance;

obtaining data for the delta instance based on the positional differences; and rendering the geometry of the base instance and the delta instance using the data, wherein the rendering includes traversing the delta instance by traversing to a child of the shared box node in the delta instance based on results of an intersection test between a ray and the shared box node.

18. The non-transitory computer-readable medium of claim 17, wherein obtaining the data comprises decompressing the delta instance based on the base instance.

19. The non-transitory computer-readable medium of claim 17, wherein the delta instance includes compressed data that is compressed using an identity compression technique.

20. The non-transitory computer-readable medium of claim 17, wherein the delta instance includes compressed data that is compressed using a delta compression technique.

* * * * *